US011989972B2

(12) United States Patent
Lee et al.

(10) Patent No.: US 11,989,972 B2
(45) Date of Patent: May 21, 2024

(54) METHOD FOR PREDICTING CHARACTERISTIC INFORMATION OF TARGET TO BE RECOGNIZED, METHOD FOR TRAINING NEURAL NETWORK PREDICTING CHARACTERISTIC INFORMATION OF TARGET TO BE RECOGNIZED, AND COMPUTER-READABLE STORAGE MEDIUM STORING INSTRUCTIONS TO PERFORM NEURAL NETWORK TRAINING METHOD

(71) Applicant: Suprema AI Inc., Seongnam-si (KR)

(72) Inventors: Hyogi Lee, Seongnam-si (KR); Kideok Lee, Seongnam-si (KR)

(73) Assignee: Suprema AI Inc., Seongnam-si (KR)

( * ) Notice: Subject to any disclaimer, the term of this patent is extended or adjusted under 35 U.S.C. 154(b) by 0 days.

(21) Appl. No.: 18/181,322

(22) Filed: Mar. 9, 2023

(65) Prior Publication Data

US 2023/0215216 A1 Jul. 6, 2023

(30) Foreign Application Priority Data

Sep. 30, 2022 (KR) ........................ 10-2022-0125645

(51) Int. Cl.
*G06V 40/16* (2022.01)
*G06V 10/77* (2022.01)
*G06V 10/774* (2022.01)
*G06V 10/82* (2022.01)

(52) U.S. Cl.
CPC ........ *G06V 40/171* (2022.01); *G06V 10/7715* (2022.01); *G06V 10/774* (2022.01); *G06V 10/82* (2022.01); *G06V 40/178* (2022.01)

(58) Field of Classification Search
CPC ............. G06V 40/171; G06V 10/7715; G06V 10/774; G06V 10/82; G06V 40/17
See application file for complete search history.

(56) References Cited

U.S. PATENT DOCUMENTS

| 2021/0117649 | A1* | 4/2021 | Gonzalez Aguirre ...................... G06V 40/161 |
| 2021/0152751 | A1* | 5/2021 | Huang ................. G06V 10/764 |
| 2021/0295015 | A1* | 9/2021 | Lei ........................ G06V 10/764 |
| 2021/0374468 | A1* | 12/2021 | Chandraker ........... G06N 3/084 |
| 2022/0024139 | A1* | 1/2022 | Schwartz ............ G05B 19/4145 |
| 2022/0100989 | A1* | 3/2022 | Zhu ........................ G06F 21/602 |

\* cited by examiner

*Primary Examiner* — Wesley J Tucker
(74) *Attorney, Agent, or Firm* — Bridgeway IP Law Group, PLLC; Jihun Kim

(57) ABSTRACT

There is provided a method for predicting characteristic information of a target to be recognized. The method comprises: acquiring a plurality of first face images for learning and characteristic information on each first face image; generating a plurality of second face images for learning obtained by synthesizing a mask image with the plurality of first face images for learning by a predetermined algorithm; and training a first neural network by using the plurality of second face images for learning as input data for learning and characteristic information as label data for each second face image corresponding to one of the first face images.

8 Claims, 2 Drawing Sheets

METHOD FOR PREDICTING CHARACTERISTIC INFORMATION OF TARGET TO BE RECOGNIZED, METHOD FOR TRAINING NEURAL NETWORK PREDICTING CHARACTERISTIC INFORMATION OF TARGET TO BE RECOGNIZED, AND COMPUTER-READABLE STORAGE MEDIUM STORING INSTRUCTIONS TO PERFORM NEURAL NETWORK TRAINING METHOD

TECHNICAL FIELD

The present disclosure relates to a technology for predicting information using a neural network, for example, deep learning, and more particularly, to a technology for predicting characteristic information with respect to a face covered by a mask.

BACKGROUND

Technologies related to face recognition are being applied in various ways such as an access control or a time and attendance management, and research on feature detection that determines detailed information such as gender when recognizing faces is continuously being conducted.

However, there is a limit for grasping characteristic information about a person entering and exiting with wearing a mask from a manager's point of view.

SUMMARY

An embodiment of the present disclosure is provided to predict information for identifying characteristic information of a target to be recognized, such as gender, age, race, and the like, from a face image covered by a mask.

In addition, the embodiment of the present disclosure is provided to train a neural network that predicts characteristic information of a target to be recognized from a face image covered by a mask.

In addition, the embodiment of the present disclosure is provided to utilize human characteristic information such as gender, age, and race as access control information of an access control system or purchase preference information of a product store.

The problems to be solved by the present disclosure are not limited to those mentioned above, and other problems to be solved that are not mentioned may be clearly understood by those skilled in the art from the description below.

In accordance with an aspect of the present disclosure, there is provided a method for predicting characteristic information of a target to be recognized, the method may comprise: acquiring a face image; and predicting the characteristic information of the target to be recognized from the face image using a pre-trained neural network, wherein the face image comprises a face image of the target wearing a mask.

The pre-trained neural network is a neural network trained based on a face image of a target for training to be recognized wearing the mask and a face image of the target for training without wearing the mask so that the neural network predicts the characteristic information of the target for training.

The characteristic information comprises at least one of age and gender of the target.

The method may comprise storing a prediction result of the characteristic information, wherein the prediction result is utilized as access control information of an access control system or purchase preference information of a product store.

In accordance with another aspect of the present disclosure, there is provided a method for predicting characteristic information of a target to be recognized, the method may comprise: acquiring a plurality of first face images for learning and characteristic information on each first face image; generating a plurality of second face images for learning obtained by synthesizing a mask image with the plurality of first face images for learning by a predetermined algorithm; and training a first neural network by using the plurality of second face images for learning as input data for learning and the characteristic information as label data for each second face image corresponding to one of the first face images.

The input data for learning further comprises the plurality of first face images for learning.

The predetermined algorithm is configured to synthesize the mask image with a face image using a second neural network trained to synthesize the mask image with an input face image.

The characteristic information comprises information on at least one of gender and age of the target to be recognized.

The plurality of second face images for learning are images in which mask feature points of the mask image are matched with facial feature points extracted from the plurality of first face images for learning, and are at least two images obtained from each first face image for learning synthesized with a plurality of types of mask images.

A size and a position of the mask image are adjusted according to positions of the mask feature points.

In accordance with another aspect of the present disclosure, there is provided a non-transitory computer-readable storage medium storing a computer program, comprising commands for a processor to perform a neural network training method, the method comprises: acquiring a plurality of first face images for learning and characteristic information on each first face image; generating a plurality of second face images for learning obtained by synthesizing a mask image with the plurality of first face images for learning by a predetermined algorithm; and training a first neural network by using the plurality of second face images for learning as input data for learning and the characteristic information as label data for each second face image corresponding to one of the first face images.

According to an embodiment of the present disclosure, by reliably predicting human characteristic information such as gender and age from a face image covered by a mask, a data on the predicted human characteristic information with high reliability can be variously used in an environment that requires accurate customer information, such as an access control system or a product store.

DETAILED DESCRIPTION

Figure 1:
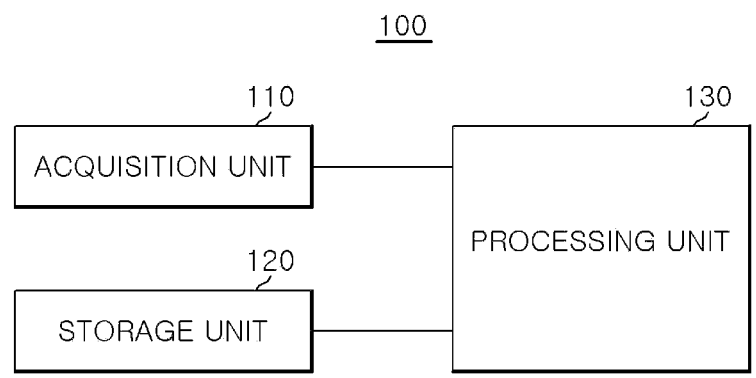
FIG. 1 is a block diagram of a characteristic information prediction apparatus according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
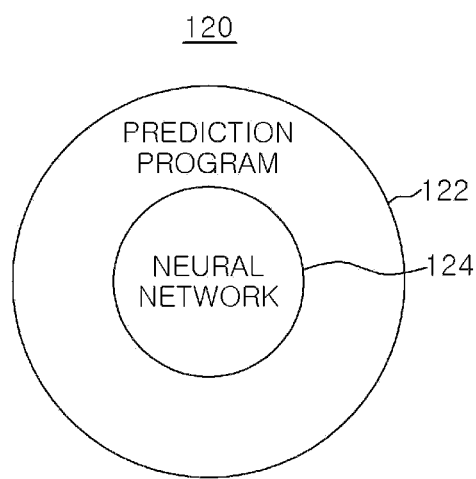
FIG. 2 is a diagram illustrating a prediction program in a storage unit of FIG. 1 for explaining a neural network for predicting characteristic information according to the embodiment of the present disclosure.

FIG. 1 is a block diagram of a characteristic information prediction apparatus 100 from a face image according to an embodiment of the present disclosure, and FIG. 2 is a diagram illustrating a prediction program in a storage unit 120 of FIG. 1 for explaining a neural network for predicting characteristic information according to the embodiment of the present disclosure.

As shown in FIG. 1, the characteristic information prediction apparatus 100 according to the embodiment of the present disclosure may include an acquisition unit 110, a storage unit 120 and a processing unit 130.

The acquisition unit 110 may acquire a person's face image from a captured image captured by a camera (not shown) installed in external environments, such as an access control system, a product store, etc. For example, the acquisition unit 110 may acquire a face image by applying conventionally known machine learning techniques such as PCA (Principal Component Analysis), MPCA (Multilinear Principal Component Analysis), LDA (Linear Discriminant Analysis), etc., as well as deep learning techniques such as CNN (Convolutional Neural Network), DNN (Deep Neural Network), YOLO (You Only Look Once), etc.

As shown in FIG. 2, the storage unit 120 may store a prediction program 122 for predicting characteristic information from the face image and information required for execution of the prediction program 122. The storage unit 120 may include all types of recording devices for storing data that can be read by a computer system, and is not limited to a specific recording device. The prediction program 122 and execution information in the storage unit 120 may be loaded by the processing unit 130 as required.

The prediction program 122 according to the embodiment of the present disclosure may include a software, for example, a neural network 124, including commands programmed to predict characteristic information, such as a person's gender, age, race, etc., from the face image, if the face image is acquired through the acquisition unit 110.

In addition, the prediction program 122 may further include a pre-processing unit, which is not shown. The pre-processing unit is a means for performing pre-processing on the face image before the characteristic information is predicted by the processing unit 130, and it is to improve the accuracy of predicting the characteristic information from the obtained face image. The pre-processing unit may generate a cropped image by cropping a region corresponding to the characteristic information in the obtained face image, and may generate a pre-processed image by applying a histogram smoothing technique or the like to the cropped image. However, the pre-processing unit is not an essential component of the characteristic information prediction apparatus 100 according to the embodiment of the present disclosure, and it may be implemented to output characteristic information prediction results without the pre-processing unit, if necessary.

Meanwhile, the face image acquired through the acquisition unit 110 may be a face image wearing a mask or a face image without wearing a mask.

The neural network 124 may be a neural network trained to predict characteristic information from a face image obtained by synthesizing a face image having characteristic information with a mask image, or may be a neural network trained to predict characteristic information from a face image wearing a mask. In addition, the neural network 124 may be a neural network trained to predict characteristic information from a face image wearing a mask, or a neural network trained to predict characteristic information from a face image without wearing a mask.

When the face image is obtained through the acquisition unit 110, the processing unit 130 may load the prediction program 122 in the storage unit 120 and command the neural network 124 in the prediction program 122 to be activated.

The processing unit 130 may predict human characteristic information, such as a person's gender, age, race, etc., from the face image acquired through the acquisition unit 110 using the neural network 124 in the prediction program 122.

As described above, since the neural network 124 is a neural network trained to predict characteristic information of a person's face even when a person is wearing a mask, the processing unit 130 may predict the person's characteristic information even in a case that the face image acquired through the acquisition unit 110 is a face image wearing a mask.

Figure 3:
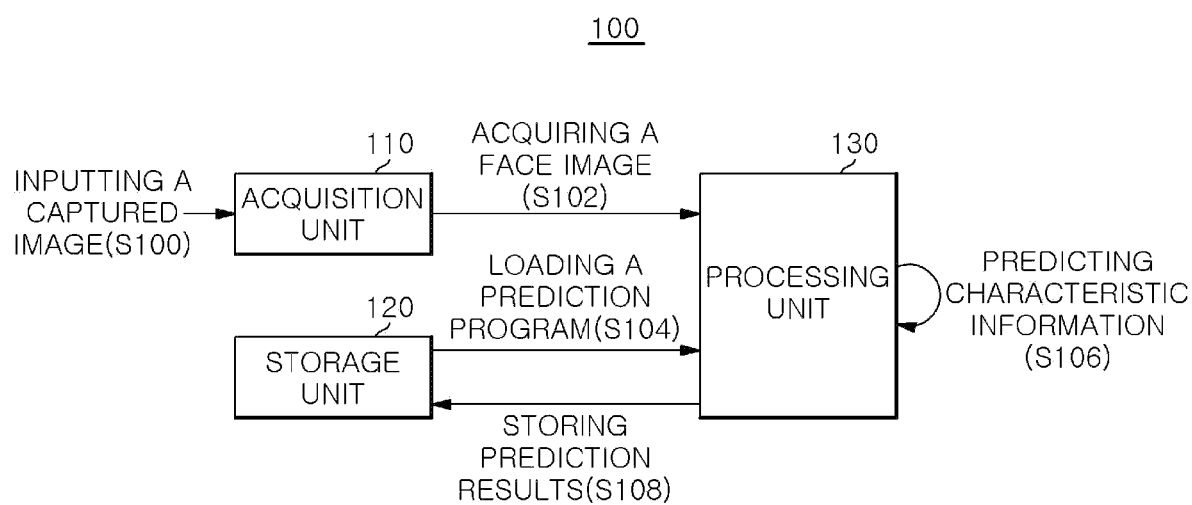
FIG. 3 is a block diagram for explaining a prediction method of a characteristic information prediction apparatus according to the embodiment of the present disclosure.

FIG. 3 is a block diagram for explaining a prediction method of the characteristic information prediction apparatus according to the embodiment of the present disclosure.

First, when a captured image is input from the outside (S100), the acquisition unit 110 may acquire a face image from the input captured image (S102).

The acquired face image is provided to the processing unit 130, and the processing unit 130 may load the prediction program 122 to predict characteristic information from the acquired face image (S104) (S106).

The neural network 124 according to the embodiment of the present disclosure may be a neural network trained to predict characteristic information from a face image wearing a mask, or a neural network trained to predict characteristic information from a face image without wearing a mask. Accordingly, the processing unit 130 may predict the characteristic information of the corresponding face image, that is, the person's age, gender, race, etc., regardless of whether the acquired face image is an image covered by a mask or not.

The processing unit 130 may store the characteristic information prediction result predicted using the neural network 124 in the storage unit 120 (S108).

As such, the characteristic information prediction result stored in the storage unit 120 as described above may be used, for example, as access control information of an access control system or purchase preference information of a product store.

Access control information may be used for areas requiring access control according to gender, such as bathhouses, saunas, toilets, etc., and may be used for areas requiring access control according to age, such as entertainment establishments, accommodations, etc.

Purchase preference information may be used in areas where it is necessary to identify preferred purchase product information according to age or gender, such as a large mart, a shopping store, or a convenience store.

Figure 4:
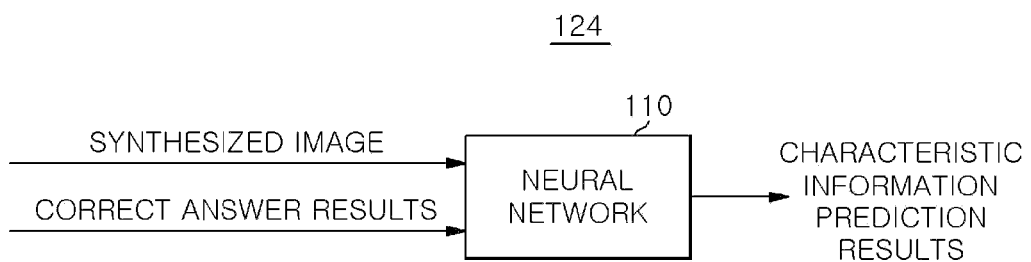
FIG. 4 is a block diagram for explaining a method of training a neural network used to predict characteristic information according to the embodiment of the present disclosure.

FIG. 4 is a block diagram for explaining a method of training the neural network 124 used to predict characteristic information according to the embodiment of the present disclosure.

As shown in FIG. 4, the neural network 124 may be trained to output a characteristic information prediction result by using a plurality of face images for learning as input data for learning and using characteristic information corresponding to each face image for learning as label data.

To this end, the processing unit 130 may obtain a plurality of first face images for learning and characteristic information on each first face image, and may generate a plurality of second face images for learning by synthesizing a mask image with the plurality of first face images for learning by a predetermined algorithm. The characteristic information may include, for example, information about the gender and age of the target to be recognized.

Here, the predetermined algorithm may include an algorithm for synthesizing a mask image with a face image by using a separate neural network learned to synthesize a mask with a plurality of input first face images for learning.

In the embodiment of the present disclosure, a plurality of second face images for learning are generated by synthesizing a mask image with each first face image for learning, and in order to synthesize the mask image with the first face image, a process of extracting facial feature points and matching the extracted facial feature points with feature points of the mask image may be included.

For example, 68 facial feature points may be set, and the feature points where a mask image is to be located may be matched to the facial feature points. Here, the feature points of the mask image may mean, for example, points for a nose area, upper and lower end areas, and a lowermost area of the mask image.

The second face image for learning may be at least two or more images for learning in which a plurality of types of mask images are synthesized from each of the first face images for learning. That is, in the embodiment of the present disclosure, instead of matching the first face image and the second face image with each other one-to-one, a plurality of second face images may be generated by synthesizing mask images from the first face image in various ways.

In addition, the size and the position of the mask image can be flexibly adjusted according to the positions of mask feature points.

In addition, in order to increase the reliability of prediction results obtained by learning of the neural network 124, the second face image may be generated by considering various conditions of the mask image, such as a specific shape, a specific location, a specific color, etc.

This second face image may be used as label data of the neural network 124, and if the correct answer result for the second face image is input to the neural network 124, the processing unit 130 may train the neural network 124 to generate predictive results of the mask wearer's characteristic information for the second face image.

Meanwhile, data input to the neural network 110 may further include a first face image as well as the plurality of second face images for learning (an image obtained by synthesizing a mask image with a face image). That is, the neural network 110 of the characteristic information prediction apparatus 100 according to the embodiment of the present disclosure may be learned to predict not only the characteristic information of a target to be recognized wearing a mask, but also the characteristic information of a target to be recognized without wearing a mask.

As described above, according to the embodiment of the present disclosure, by reliably predicting human characteristic information such as gender, age, etc., from a face image covered by a mask, it is expected to use data on the predicted human characteristic information with high reliability variously in an environment requiring accurate customer information, for example, an access control system or a product store.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable storage medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for predicting characteristic information of a target person to be recognized, the method comprising:
   acquiring a face image; and
   predicting the characteristic information of the target person to be recognized from the face image using a first pre-trained neural network,
   wherein the face image comprises a face image of the target person wearing a mask,
   wherein the characteristic information includes gender, age, or race of the target person contained in the face image,
   wherein the first pre-trained neural network is trained based on a plurality of first face images, a plurality of second face images, and characteristic information on each of the plurality of first face images, and on each of the plurality of second face images,
   wherein the plurality of first face images are images acquired by capturing non-covered faces, and
   wherein the plurality of second face images are images synthesized, by a second pre-trained neural network, by synthesizing each of a plurality of mask images with each of the plurality of first face images, wherein each of the plurality of mask images represents a distinctive type, color and shape of mask, wherein the second pre-trained neural network is trained to synthesize a mask image with a face image, and wherein the synthesizing each of the plurality of mask images with each of the plurality of first face images comprises extracting a plurality of facial feature points from the each of the plurality of first face images, determining a plurality of mask feature points for each of the plurality of mask images that represent a set of salient geometry points of the each of the plurality of mask images, matching the plurality of mask feature points in a plurality of sizes of the each of the plurality of mask images with the plurality of facial feature points in a plurality of locations of the each of the plurality of first face images to produce the plurality of second face images.

2. The method of claim 1, wherein the first pre-trained neural network is a neural network trained based on a face image of a target person for training to be recognized wearing a mask and a face image of the target person for training without wearing the mask so that the first pre-trained neural network predicts the characteristic information of the target person for training.

3. The method of claim 1, wherein the step of predicting further comprises pre-processing the face image by cropping a region corresponding to the characteristic information in the face image to produce a cropped image, then applying a histogram smoothing technique to the cropped image to produce a smoothed cropped image, and then making prediction based on the smoothed cropped image.

4. The method of claim 1, further comprising:
   storing a prediction result of the characteristic information,
   wherein the prediction result is utilized as access control information of an access control system or purchase preference information of a product store.

5. A method for training a neural network that is configured to predict characteristic information of a target person to be recognized, the method comprising:
   acquiring a plurality of first face images for learning and characteristic information on each of the plurality of first face images, wherein each of the plurality of first face images is a face image of a person wearing a mask, and wherein the characteristic information corresponding to each of the plurality of first face images includes gender, age, or race of the person contained in the each of the plurality of first face images;
   generating, by a second pre-trained neural network, a plurality of second face images for learning by synthesizing each of a plurality of mask images with each of the plurality of first face images, wherein each of the plurality of mask images represents a distinctive type, color and shape of mask, wherein the second pre-trained neural network is trained to synthesize a mask image with a face image, and wherein the synthesizing each of the plurality of mask images with each of the plurality of first face images comprises extracting a plurality of facial feature points from the each of the plurality of first face images, determining a plurality of mask feature points for each of the plurality of mask images that represent a set of salient geometry points of the each of the plurality of mask images, matching the plurality of mask feature points in a plurality of sizes of the each of the plurality of mask images with the plurality of facial feature points in a plurality of locations of the each of the plurality of first face images to produce the plurality of second face images; and
   training a first neural network by using the plurality of first face images and the plurality of second face images for learning as input data for learning and the characteristic information as label data for each of the plurality of first face images and each of the plurality of second face images.

6. The method of claim 5, wherein the synthesizing each of the plurality of mask images with each of the plurality of first face images further comprises adjusting sizes and positions of each of the plurality of mask images prior to carrying on the step of matching the plurality of mask feature points in a plurality of sizes of each of the plurality of mask images with the plurality of facial feature points in a plurality of locations of each of the plurality of first face images to produce the plurality of second face images.

7. A non-transitory computer-readable storage medium storing a computer program, comprising commands for a processor to perform a neural network training method for predicting characteristic information of a target person to be recognized, the method comprising:

acquiring a plurality of first face images for learning and characteristic information on each of the plurality of first face images, wherein each of the plurality of first face images is a face image of a person wearing a mask, and wherein the characteristic information corresponding to each of the plurality of first face images includes gender, age, or race of the person contained in the each of the plurality of first face images;

generating, by a second pre-trained neural network, a plurality of second face images for learning obtained by synthesizing each of a plurality of mask images with each of the plurality of first face images, wherein each of the plurality of mask images represents a distinctive type, color and shape of mask, wherein the second pre-trained neural network is trained to synthesize a mask image with a face image, and wherein the synthesizing each of the plurality of mask images with each of the plurality of first face images comprises extracting a plurality of facial feature points from the each of the plurality of first face images, determining a plurality of mask feature points for each of the plurality of mask images that represent a set of salient geometry points of each of the plurality of mask images, matching the plurality of mask feature points in a plurality of sizes of each of the plurality of mask images with the plurality of facial feature points in a plurality of locations of each of the plurality of first face images to produce the plurality of second face images; and training a first neural network by using the plurality of first face images and the plurality of second face images for learning as input data for learning and the characteristic information as label data corresponding to each of the plurality of first face images and each of the plurality of second face images.

8. The non-transitory computer-readable storage medium of claim 7, wherein the synthesizing each of the plurality of mask images with each of the plurality of first face images further comprises adjusting sizes and positions of each of the plurality of mask images prior to carrying on the step of matching the plurality of mask feature points in a plurality of sizes of each of the plurality of mask images with the plurality of facial feature points in a plurality of locations of each of the plurality of first face images to produce the plurality of second face images.

* * * * *